United States Patent [19]

Kawano et al.

[11] 4,224,542
[45] Sep. 23, 1980

[54] SMALL-SIZED MOTOR WITH CENTRIFUGAL GOVERNOR SWITCH

[75] Inventors: Masatoshi Kawano, Katano; Tsutomu Hashimoto, Shijonawate; Miyuki Furuya, Neyagawa, all of Japan

[73] Assignee: Matsushita Electric Industrial Co., Ltd., Kadoma, Japan

[21] Appl. No.: 850,148

[22] Filed: Nov. 10, 1977

[30] Foreign Application Priority Data

Dec. 21, 1976 [JP] Japan ................................ 51-172085

[51] Int. Cl.² .......................................... H02K 11/00
[52] U.S. Cl. .................................. 310/68 E; 310/235; 200/80 R; 318/462
[58] Field of Search ...................... 310/68 E, 75, 68 R, 310/75 B, 231, 235, 40 MM, 237, 43, 234, 233; 318/325, 330, 335, 462; 200/80 R

[56] References Cited

U.S. PATENT DOCUMENTS

| 3,473,063 | 10/1969 | Forste | 310/235 |
|---|---|---|---|
| 3,515,972 | 6/1970 | Hurst | 318/462 |
| 3,531,669 | 9/1970 | Samuta | 310/68 E |
| 3,662,240 | 5/1972 | Yukisada | 318/330 |
| 3,812,576 | 5/1974 | Yamaguchi | 310/235 |
| 4,015,181 | 3/1977 | Karube | 318/325 |

FOREIGN PATENT DOCUMENTS 1155520 10/1963 Fed. Rep. of Germany ........ 310/68 E

*Primary Examiner*—R. Skudy
*Attorney, Agent, or Firm*—Cushman, Darby & Cushman

[57] ABSTRACT

Fixed members of the small-sized motor centrifugal governor switch and commutator segment metals are secured to a boss of a molding insulating resin mounted on a shaft of the rotor, thereby disposing the centrifugal governor switch on the same side as the commutator with respect to the rotor. With this construction, there is no need of installing the centrifugal governor switch in the space radially centrally of the stator magnet, hence there is no need of restricting the size of the centrifugal governor switch to be smaller than the inner diameter of the stator magnet. Accordingly the centrifugal governor switch can be made larger, thereby securing a better function.

2 Claims, 11 Drawing Figures

SMALL-SIZED MOTOR WITH CENTRIFUGAL GOVERNOR SWITCH

FIELD OF THE INVENTION

This invention relates to a small-sized motor with commutator having centrifugal governor switch.

BACKGROUND OF THE INVENTION

In conventional small-sized motors such as the one disclosed in United States Patent of Yukasada et al, U.S. Pat. No. 3,662,240, issued May 9, 1972, a centrifugal governor switch is disposed on a rotor core or on the opposite side of the commutator with respect to the rotor. One example of such conventional small-sized motor is elucidated referring to FIG. 5 to FIG. 10 hereof. FIG. 5 is a sectional elevation view of a small-sized motor wherein a rotor 3 is mounted on a shaft 5 and a ring-shaped stator magnet 7 is installed in a metal case 6. On both (upper and lower) sides of the rotor 3, a centrifugal governor switch 1 and a commutator 4 are mounted on the shaft 5, with the rotor 3 axially between them.

The centrifugal governor switch 1 comprises, as shown in the plan view of FIG. 6 and in the partly cut-away elevation view of FIG. 7, a molding 9 of an insulating plastic resin, mounted on the shaft 5. A fixed contact plate 8a, having a fixed contact point 11a mounted in an adjustable manner is secured by one end thereof to the molding 9. A centrifugal moving contact plate 8b of resilient metal, having a moving contact point 11b and a centrifugal weight 10 is secured by one end thereof to the molding 9, and a counter weight member 12, 8c is secured to the molding 9.

The commutator 4 comprises, as shown in the plan view of FIG. 8, in the partly cut-away elevation view of FIG. 9 and in the circuit diagram of FIG. 10, a molding 14 of an insulating plastic resin mounted on the shaft 5 and a specified number of metallic commutator segments 13a, 13b, 13c and 13d having risers 131a, 131b, 131c and 131d, respectively. The base parts of the risers 131a, 131b, 131c and 131d, and the one ends, as well as the central inside space among the metallic segment metals 13a, 13b, 13c and 13d are filled and enclosed with the material of the molding 14, so as to be firmly secured thereto. Ends of the coils 2, 2 of the rotor 1 are connected to the risers 131a, 131b, 131c and 131d of the segment metals 13a, 13b, 13c and 13d. Actually, these segment metals 13a, 13b, 13c and 13d are made of a metal pipe having risers 131a, 131b, 131c and 131d at one end. After molding, when the resin has hardened about the filled and enclosed parts, a specified number of slits, parallel to the axis of the pipe are cut into the pipe wall and the resin within the pipe, thereby electrically isolating the metal pipe into the cylindrically arranged, arcuate metal segments.

Since the commutator 4 and the governor switch 1 are disposed on both sides of (i.e. above and below) the rotor 3, the conventional small-sized motor has the following shortcomings:

Firstly, since the stator magent 17 is disposed in the central part of the inside space in the case 6, the governor switch 1 must be smaller in diameter than the inside diameter of the stator magnet 7, in order that the governor switch 1 can be inserted in the inner-most part of the case 6 through the space centrally of the stator magnet 7. Because of the above-mentioned restriction of the diameter of the governor switch 1, a sufficient centrifugal force is not obtainable and hence a large contact pressure is not obtainable for the contacts 11a and 11b.

Secondly, since the governor switch 1 and the commutator 4 are disposed separately on both sides of the rotor 3, two steps of press-mounting are necessary for mounting the governor switch 1 and the commutator 4 on the shaft 5.

Thirdly, since the governor switch 1 and the commutator 4 are disposed on opposite sides of the rotor 3, long connecting wires are necessary from the fixed contact plate 8a and moving contact plate 8b to the risers 131a and 131d, respectively, besides connections of ends of the coils 2 and 2 to the risers 131a, 131b, 131c and 131d, thereby necessitating soldering of many wire ends.

SUMMARY OF THE PRESENT INVENTION

The object of the present invention is to provide an improved small-sized motor wherein the number of separate parts is decreased and the number of connections of wire ends is also decreased, thereby enabling cost reduction and improving integrity.

The small-sized motor of the present invention is characterized in that fixed members of the small-sized motor centrifugal governor switch and commutator segment metals are secured to a boss of a molding insulating resin mounted on a shaft of the rotor, thereby disposing the centrifugal governor switch on the same side as the commutator with respect to the rotor. With this construction, there is no need of installing the centrifugal governor switch in the space radially centrally of the stator magnet, hence there is no need of restricting the size of the centrifugal governor switch to be smaller than the inner diameter of the stator magnet. Accordingly the centrifugal governor switch can be made larger, thereby assuring a better function.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 1 is a longitudinal sectional view of the example of a small-sized motor provided with a unitary centrifugal governor switch/commutator structure in accordance with the present invention;

FIG. 2 is a bottom plan view of the unitary commutator and centrifugal governor switch body of the present invention;

FIG. 3 is a side elevation view, partly broken away, of the body of FIG. 2;

FIG. 4 (a) and FIG. 4 (b) are alternative typical circuit diagrams of the small-sized motor of FIG. 1 of the present invention;

FIG. 5 is a longitudinal sectional view of an example of small-sized motor of the prior art;

FIG. 6 is a plan view of a conventional centrifugal governor switch of the prior art device of FIG. 5;

FIG. 7 is a side elevation view, partly broken away, of the centrifugal governor switch of FIG. 6;

FIG. 8 is a plan view of a conventional commutator of the prior art device of FIG. 5;

FIG. 9 is a side elevation view, partly broken away, of the conventional commutator of FIG. 8.

FIG. 10 is a typical circuit diagram of the small-sized motor of the prior art device of FIG. 5.

DETAILED OF THE PRESENTLY PREFERRED EMBODIMENTS

Figure 1:
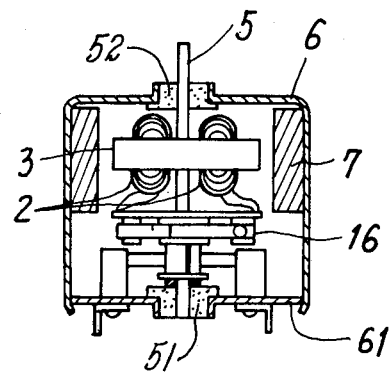
FIG. 1 to FIG. 4 show one example of the present invention, with one variation.

FIG. 1 to FIG. 4 show a preferred example of the present invention. As shown in FIG. 1, the small-sized motor embodying the present invention comprises a metal casing 6 having a pair of bearings 51 and 52 on the body and on the lid 61 thereof, respectively. A known ring-shaped stator magnet 7 is disposed at the innermost part of the case 6 and has at least a pair of magnetic poles along the ring thereof. A rotor 3 is mounted on a shaft 5 which is journalled by the bearings 51 and 52. There is provided on the shaft 5 a novel assembly 16 which is a combination of a centrifugal governor switch and a commutator united in one assembly. Accordingly, the centrifugal governor switch and the commutator are disposed on the same side, namely the outer side with respect of the rotor 3 where the lid 61 is secured to the body of the casing 6.

The assembly 16 comprises a set of cylindrically arranged arcuate metallic commutator segments 13a, 13b, 13c and 13d having risers 131a, 131b, 131c and 131d at their one ends, respectively. The risers 131a, 131b, 131c and 131d are electrically as well as mechanically connected to specified parts of connecting plates 16a, 16b, 16c and 16d, respectively, by for example, electrical spot welding. The metallic commutator segments 13a, 13b, 13c and 13d and the connecting plates 16a, 16b, 16c and 16d are molded into one united body by means of a molding 18 of an insulating plastic resin.

Figure 4A:
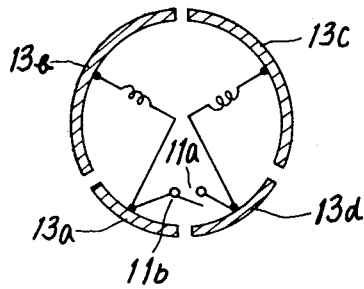
Figure 2:
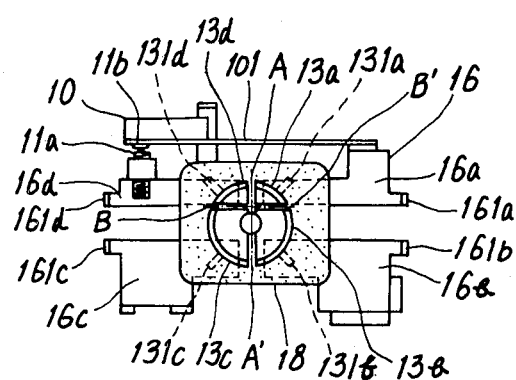
Figure 4B:
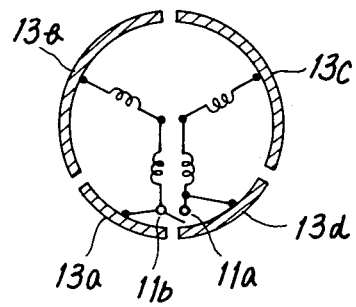
Figure 3:
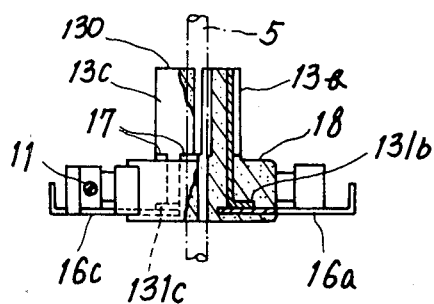
Figure 5:
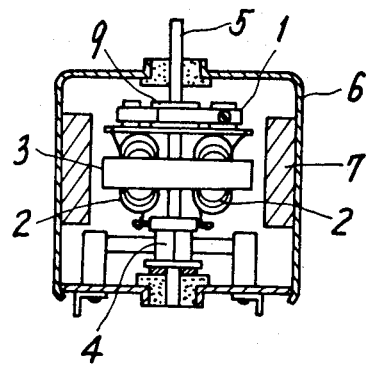
FIG. 5 to FIG. 10 show one example of a conventional apparatus.
Figure 8:
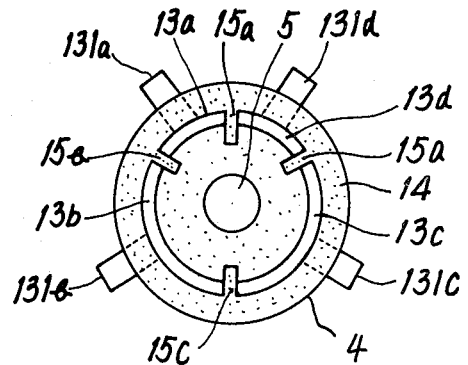
Figure 6:
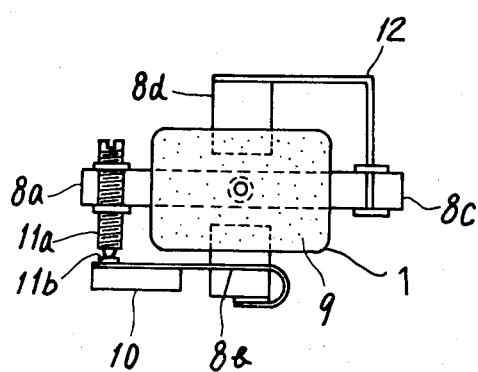
Figure 9:
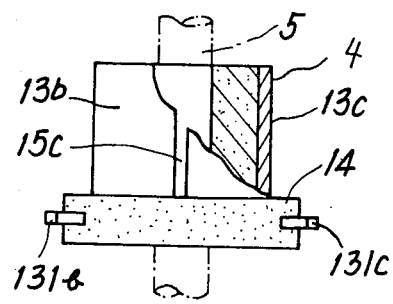
Figure 7:
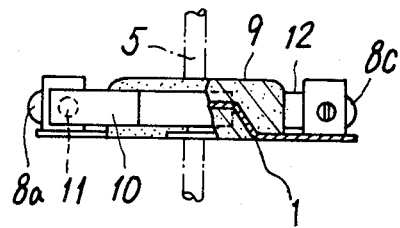
Figure 10:
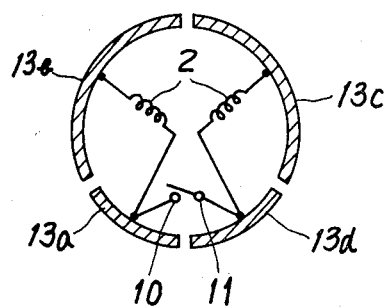

The actual making of the commutator segment metals 13a, 13b, 13c and 13d is as follows: First, a metal pipe having risers 131a, 131b, 131c and 131d is connected to the connecting plates 16a, 16b, 16c and 16d, by spot-welding at the risers 131a, 131b, 131c and 131d. Then, these parts are molded by resin in such a manner that the pipe is filled with the resin and the resin continuously covers the spot-welding parts. The resin is permitted to harden. Then, two vertical slots (along chordal planes A-A' and B-B') are cut by, for example, moving a metal saw downward from the top face 130 until intersecting the notches 17 in the lower end of the metal pipe, so that the pipe is electrically divided into the several commutator segments. A moving contact plate 101 having a moving contact 11b and a centrifugal weight 10 is spot-welded to a part of the connecting plates 16a and a fixed contact 11a is adjustably secured to a part of the connecting plate 16d. Ends of rotor coils 2 and 2 are connected to the connecting tips 161a, 161b, 161c and 161d of the connecting plates 16a, 16b, 16c and 16d, thereby forming a circuit as shown in FIG. 4(a) or as shown in FIG. 4(b).

Since the governor switch consisting of the contacts 11a and 11b is connected to the connecting plates 16a and 16b, respectively, there is no need of providing connecting wires between the commutator segment and the governor switch. Therefore, connecting only the ends of the rotor coils 2 and 2 to the end tips 161a, 161b, 161c and 161d will suffice.

As has been described in detail, the small-sized motor of the present invention has the following advantages:

Since the centrifugal governor switch of the present invention is combined in one body with the commutator by means of continuous resin molding and spot-welding of the commutator segment metals to the connecting metals of the centrifugal governor switch, the governor switch needs not be inserted in the inner-most part through the central space radially inwardly of the ring-shaped stator magnet. Accordingly, the centrifugal governor witch of the invention can be made larger than the conventional one. Accordingly, a larger centrifugal force is obtainable, thereby enabling to afford a larger contact pressure, hence more reliable governor action and longer life of the governor switch than is conventionally obtainable.

Since the centrifugal governor switch and the commutator are combined in one, united body, the number of parts of the motor, the number of soldering the wires and the number of press-mountings of parts on the shaft are decreased, thereby decreasing the time and the cost for manufacturing the motor.

Furthermore, since the conventionally-required long wires connecting the centrifugal governor switch and the commutator, which conventionally are disposed on opposite sides of the rotor, are eliminated, reliability of the motor is increased.

What we claim is

1. A small-sized motor comprising:

a casing having a pair of opposed bearings;

a ring-shaped stator having a circular space;

a rotor rotatably disposed in said circular space in said stator;

a shaft which is journalled by said bearings said rotor being mounted on said shaft;

a commutator having a specified number of metal segments;

said commutator being mounted on said shaft;

a plurality of rotor coils wound in said rotor and connected by the ends thereof to said metal segments;

a centrifugal governor switch having a fixed contact and a moving contact connected to corresponding ends of said rotor coils;

characterized in that:

said centrifugal governor switch is disposed around said shaft and adjoins said commutator axially on the same side with respect to said rotor, axially adjoining the rotor and stator;

a corresponding said specified number of connecting plates are connected each to a respective said metal segment;

a molding of insulating plastic resin is provided and embeds a portion of each of said connecting plates and a portion of each of said metal segments therein, including where each metal segment is connected to a respective connecting plate, but not including a respective connecting tip of each connecting plate, these connecting tips remaining exposed, said rotor coil ends being attached to respective ones of said metal segments via respective ones of said connecting tips;

said molding thus mechanically uniting all of said metal segments and all of said connecting plates in a common body, said molding being mounted on said shaft; and said moving contact and said fixed contact of said centrifugal governor switch are secured to a respective two ones of said connecting plates, the fixed contact being directly secured to the respective one of said two connecting plates and the moving contact being indirectly secured to the respective other of said two connecting plate via the intermediacy of an elongated moving contact plate which is secured at one end thereof to said other connecting plate, said moving contact being provided on an opposite, free end of said moving contact plate.

2. The small-sized motor of claim 1 wherein:
said metal segments are electrically isolated from each other at respective segment gaps by a plurality of slots extending chordally along planes parallel to the axis of said commutator, each of said slots extending from one segment gap to an opposing segment gap.

* * * * *